July 3, 1928.
E. A. M. ALRIC
1,675,780
METHOD AND MEANS FOR PREVENTING OVERHEATING OF BEARINGS
Filed Oct. 20, 1925　　2 Sheets-Sheet 1
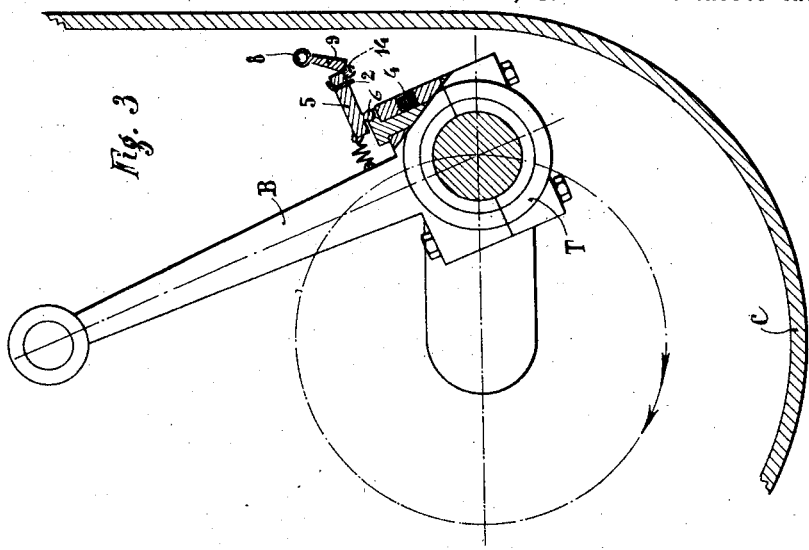
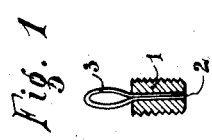
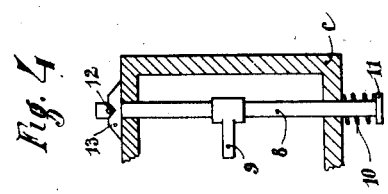
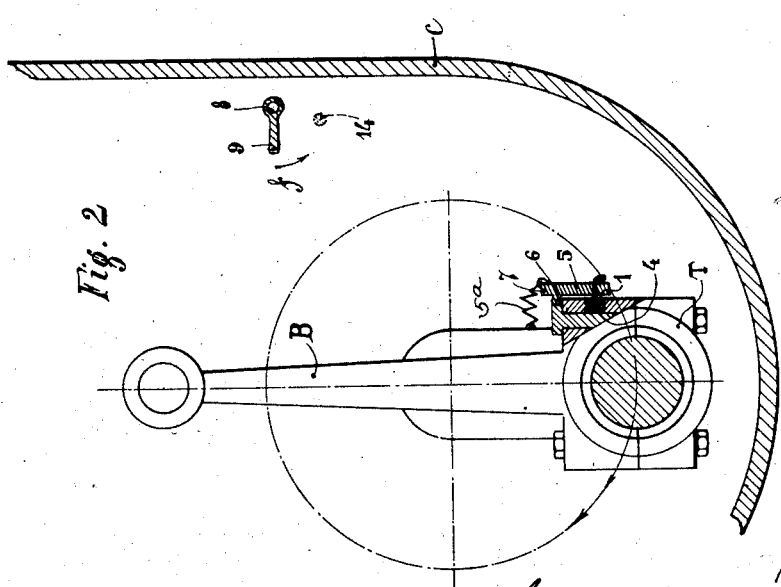

July 3, 1928.
E. A. M. ALRIC
1,675,780
METHOD AND MEANS FOR PREVENTING OVERHEATING OF BEARINGS
Filed Oct. 20, 1925   2 Sheets-Sheet 2
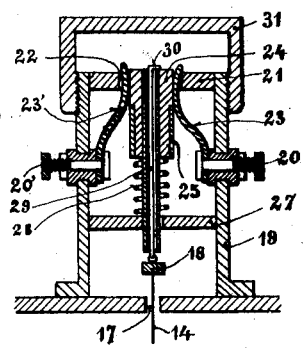
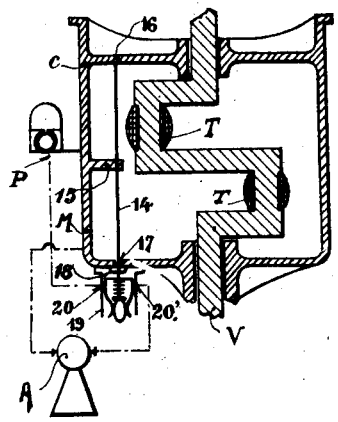
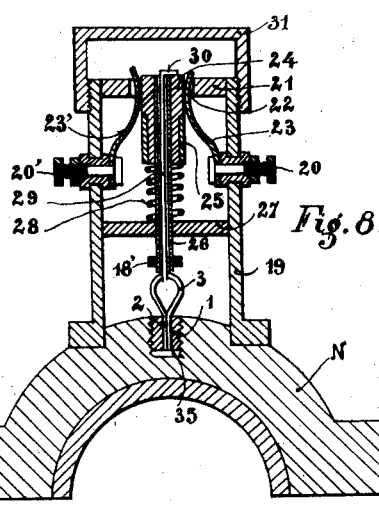
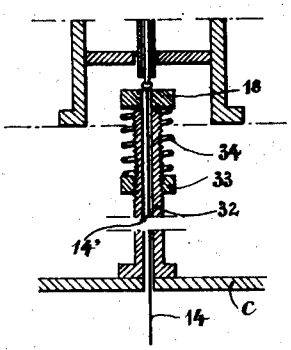
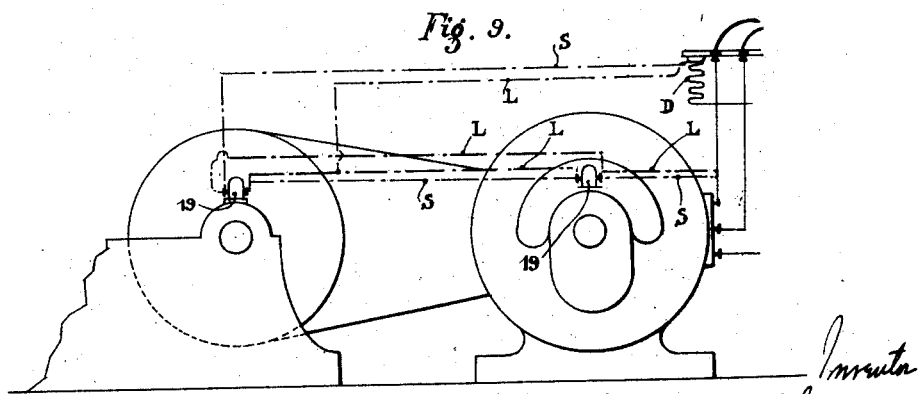
Inventor
Emile Albert Marius Alric
By B. Singer, Atty Patented July 3, 1928.

1,675,780

UNITED STATES PATENT OFFICE.

EMILE ALBERT MARIUS ALRIC, OF PORTES, NEAR LA VERNAREDE, FRANCE.

METHOD AND MEANS FOR PREVENTING OVERHEATING OF BEARINGS.

Application filed October 20, 1925, Serial No. 63,750, and in France February 9, 1925.

The present invention refers to a safety device which prevents undue heating of parts of machinery, such as connecting rod brasses, bearings, etc. The design of this device enables it, either to bring about a stoppage of the engine, or simply to warn the driver of the danger, by working an electric alarm of suitable type.

The principal advantages of this device are as follows:—

1. It protects the machinery against the risk of damage involved by abnormal heating.

2. It controls the rate of heating of parts which are of difficult access, and facilitates the supervision of a machine in the course of working.

3. It reduces the cost of maintenance by preventing seizing and running out of brasses.

The essential parts of this device are a fusible plug which is fitted in various manners, according to the nature of the part to be protected, and a system of transmission which brings into play either a circuit-breaker or an alarm-device.

This invention will be clearly understood by reference to the attached drawing, which shows:—

Fig. 1, a section through the fusible plug.

Figs. 2 and 3, a mode of application of the said device to a movable part, a connecting-rod of an engine.

Fig. 4 is a sectional view of the same.

Fig. 5 is a diagrammatic horizontal section through an engine with two cylinders, showing a mode of application of the safety device with sliding switch.

Fig. 6 is a vertical section showing a form of the invention applied to a fixed part.

Fig. 7 is a diagram showing an application of the invention to an electric circuit generating set.

Fig. 8 is a vertical section, showing a mode of application of the said device to a fixed part, a bearing.

Fig. 9 is a diagrammatic view showing an application of the said device to an electric current generating set.

For the purpose of detecting abnormal rises of temperature use is made of a threaded fusible plug 1 (Fig. 1), made of a suitable alloy, with a lead, bismuth, or tin base, for instance. The proportion of the three metals may be varied for the purpose of obtaining a higher or lower melting point, in accordance with the various cases of application taken into consideration, and in which the main factor is constituted by the nature of the lubricating oil employed. Good results are obtained with an alloy consisting of equal parts of lead, bismuth, and tin, the melting point of which is situated approximately between 115° and 118°.

It is, however, obvious that every alloy or metal which has a sufficiently low melting point can be employed for making a fusible plug. Through the centre of the plug 1 runs a core, consisting of an iron wire 2 which is soldered to the mass, bent over on itself, and which forms a loop 3 outside the plug, for the purpose of maintaining the cut-off mechanism under tension.

The fusible plug or element may be of any suitable kind.

The parts to be protected may be movable (such as the brasses of connecting-rod ends), or fixed (such as the brasses of bearings). In all cases, the fusible plug 1 may be fitted, either in the brasses themselves, or in the caps of the bearings according to the mode of application employed. Two modes of fitting the fusible plug are described hereinafter.

First case, that of a movable part: If we assume that the plug is to be fitted on the end of a connecting rod (of the internal combustion engine of a motor-car, for instance), the said connecting-rod being merely quoted here as an example of a moving part, the said plug 1 is screwed into a hole 4 drilled and threaded in the end of a connecting-rod T.

An engaging finger 5, which is mounted on the side of the connecting-rod end, and which can be made to pivot round the swivelling axle 6, is fitted with a projection 7 which prevents the said finger from tilting over completely. A spring 5ª, tends to compel the said finger to place itself in the position shown by Fig. 3. This finger is held in its position of rest under tension merely by a binding wire which is attached to the loop 3 of the plug. (Fig. 2).

In the event of the plug element melting in consequence of an abnormal heating of the brasses, the finger 5, driven by its spring, leaves its position of rest, and places itself in the open position shown by Fig. 3, whilst pulling out the iron wire core 2 which serves as its point of fixation.

In the case of a modified form of execution which is shown diagrammatically by Fig. 5, a plain iron wire 14 is employed, which is stretched in the crank-case C. This wire, when it is cut by the finger 5, released by the melting of the plug 1, causes a circuit-breaker of suitable type to come into play. The iron wire 14 is stretched parallel to the crankshaft V, and may be carried, if required, by suitable supports 15. One of its ends is secured to the crank-case at point 16. Its other end runs freely through a hole 17 made in the crankcase, and is soldered to a disc 18, which is free and independent of the crank-case.

The wire 14 is placed at such a distance that the end of the connecting-rod T, which carries the finger 5 in its position of rest under tension (Fig. 2), clears the said wire without risk of contact, and that, when the said finger is released (Fig. 3), it catches the wire which it cuts in the course of rotation.

To the disc 18 is attached the wire connection which keeps a circuit-breaker 19 of suitable type in the off position, as shown, by way of an example, in Fig. 7. This sliding switch is fitted with two lateral terminals 20 and 20', which are suitably insulated. In the upper part is fitted a plug 21 made of insulating material, in the centre of which is made a rectangular hole 22. Through this hole and parallel to its smaller sides run two brass friction plates 23 and 23', which are attached respectively to the terminals 20 and 20'.

A sleeve 24 of square section, made of insulating material, slides in the hole 22. Two of the faces of this sleeve are guided by the larger sides of the hole 22, whilst the friction plates 23 and 23' press on the two remaining faces. The bottom part of this sleeve 24 carries a brass casing 25 which fits exactly with the sides of the sleeve, through which runs a tube 26 which projects on the side of the brass ring 25, and which is level with the other end of the sleeve.

This tube 26 runs through the guide 27 which is solid with the frame of the switch 19. A cylindrical helical spring 28 which is inserted between the guide 27 and the sleeve, tends to drive the said sleeve outside the switch, in such a manner that the brass casing 25 comes into contact with the friction plates 23 and 23', whereby the circuit is closed.

One of the ends of a wire 29 is attached to the disc 18 and the other end 30 of the said wire is bent over, for the purpose of maintaining the sleeve 24 in the position shown by Fig. 5.

For the purpose of fitting the switch 19, the iron wire 29 is run through the tube 26, and, after the switch has been mounted, the sleeve 24 is driven down in order to compress the spring 28 and to place the insulating part of the sleeve between the friction plates 23 and 23', after which the end 30 of the wire is bent over, with a view to holding the sleeve in this open circuit position.

On the upper part of the switch is fitted a cover 31, with sufficient play between the bottom of the said cover and the disc 21 for the sliding motion of the sleeve.

Ordinarily the switch can be fitted directly on the crank case.

If, owing to abnormal heating, the finger 5 is caused to cut the wire 14 which is stretched in the crank-case, the sleeve 24 is released and moves until the disc-stop 18 comes into contact with the guide 27, whereupon the brass casing 25 closes the circuit between the friction plates 23 and 23' and the terminals 20 and 20'.

For the purpose of fitting the switch 19 on the circuit of the alarm-device and of the magneto, the terminal 20 is connected with the primary circuit P of the ignition device, whilst the terminal 20' is connected with one of the terminals of an electric alarm-device A, the other terminal of which is put to frame. One single alarm-device A is sufficient, whatever the number of the switches 19 fitted, because they are all connected with one and the same terminal of the alarm-device A, the resistance of which is such that, when it is inserted between the primary ignition circuit and the frame, the ignition is cut in such a manner as to stop the engine, whilst the alarm-device is worked by current supplied by the primary circuit.

What I claim is:—

1. In combination with a movable machine element, a bearing member movable with said machine element, a fuse mounted directly on said bearing element and fusible thereby when said bearing element is overheated, an actuating element also carried by said bearing element and movable to actuating position, a controlling element held by said fuse and normally holding said actuating element in inoperative position, said actuating element being released by the melting of the fuse and its consequent release of said controlling element and functioning apparatus including a controlling member, said controlling member being normally out of the path of movement of said actuating member and in the path of movement of said actuating member, for engagement thereby, when said actuating member is released upon the fusion of the plug.

2. In combination with a movable machine element, a bearing member movable with said machine element, a fuse mounted directly on said bearing element and fusible thereby when said bearing element is overheated, an actuating element movably mounted on the bearing element and normally connected to and held by the fuse in inoperative position and a normally inactive controlling member normally out of the path of movement of said actuating member and in the path of movement of said actuating member for engagement thereby when said actuating member is released by the fuse of the plug.

3. Apparatus as claimed in claim 2 in which the actuating element is pivotally connected to the bearing member and is swingable outwardly therefrom to engage the controlling member and a wire connection is provided between said actuating member and the plug and is partly embedded in the plug and serves to hold said actuating member in closed position against the bearing member and out of contacting position with the controlling member until the fusing of the plug releases said actuating member.

In witness whereof I affix my signature.

EMILE ALBERT MARIUS ALRIC.